Patented Apr. 11, 1939

2,154,069

UNITED STATES PATENT OFFICE 2,154,069

CERAMIC BODY

Albra H. Fessler, Flint, Mich., and Hans Navratiel, Lauf, near Nuremberg, Germany No Drawing. Application December 26, 1935, Serial No. 56,234. In Great Britain December 17, 1928

2 Claims. (Cl. 106—11)

This is a continuation in part of our prior applications, Serial Nos. 311,703, filed Oct. 10, 1928 and 421,587, filed January 17, 1930.

This invention relates to ceramic bodies, and particularly to porcelain bodies characterized by high resistance against thermal shock, high thermal conductivity, high electrical insulating properties at elevated temperatures and low modulus of elasticity. The properties defined are particularly valuable in the case of chemical porcelain, pyrometer tubes, stoneware and spark plug insulators. It is in connection with the development of suitable porcelains for spark plug insulators that we have developed the ceramic body forming the subject of this application.

Our new bodies are characterized by a high alumina content, low silica content and low flux content. The flux employed is lithia, which yields in the formation of the non-plastic content of the bodies within the range of composition covered by our work, a comparatively high-alumina glass intercalated in extremely thin plates of alpha-alumina or corundum. This is in contrast to the high-silica content of glasses usually incorporated in ceramic bodies. Our researches have shown that the glass may have as little as 40% $SiO_2$. It varies somewhat, of course, depending upon the exact composition employed. This low silica content and the characteristic distribution of the glass have several notable advantages when incorporated with clay to make a porcelain. In the first place, it makes it possible to use smaller amounts of flux than is normally possible without raising too greatly the temperature at which the porcelain matures. In the maturing process the flux added to a porcelain reacts with the glass derived from the clay constituents, and the rate and degree of reaction in part depend upon the contrast in composition between the glass developed from the clay and that of the fluxing element. As is well known, the glass derived from clay is very high in silica. If then it is brought into contact with another glass which differs little from it in composition, there will be little reaction between the two, and that will proceed slowly. On the other hand, if the fluxing glass is low in silica, and hence high in alumina and fluxing oxide, the reaction may be expected to proceed much more rapidly and to be more pronounced. Hence the desired cementing effect is obtained more readily in our bodies because of the contrast in the composition of the glass derived from the clay element and of our high-alumina glass containing the flux. Another advantage is in the distribution of the glass. In our product some of the fluxing glass, as mentioned above, is intercalated between the microscopically thin layers of corundum. This serves the dual purpose of padding or cushioning the corundum crystals in such a way that their greater thermal expansion is not effective in disrupting the porcelain, and of associating the flux so intimately with the resistant corundum that it is as firmly cemented in the porcelain as is the mullite derived from the clay, or any other constituent of the body. Still another advantage conferred by this low-silica glass is a very great resistance to heat shock. This is apparently due to the character of the glass phase, which has an extremely low thermal expansion. This has been nicely illustrated by a comparison of two bodies made according to our process herein described which differed somewhat in lithia content only. In one case it was sufficiently high to insure the formation of the high-alumina glass mentioned above, in the other case just insufficient to achieve this. The former porcelain had an unusually low coefficient of thermal expansion, while that of the latter was no lower than for an ordinary feldspar porcelain.

Employing lithium as the flux, bodies are obtained having alumina in a new form, which we have designated as zeta-alumina. These bodies have as an outstanding characteristic, very great resistance to heat shock.

In general the method of preparing the porcelain bodies is the same irrespective of the composition. Briefly, we first produce fused material containing the corundum crystals and the high alumina glass. This material is then finely pulverized and is thoroughly mixed with clay, preferably in equal proportions, and the batch is pugged and worked in the usual manner. The proportions of clay and fused material are not critical, it being essential that enough clay be added to give proper workability to the raw batch. From the resultant raw batch the plugs are molded and are then fired to vitrification. We have obtained excellent porcelains by firing to temperatures in the neighborhood of cones 17 to 19, the precise temperature varying with the exact composition of the porcelain.

We shall now describe in detail the method of producing the fused material. This material is prepared from a mixture of alumina, silica and a flux containing lithium. A part of the alumina and silica is most conveniently added in the form of clay. The mixture is characterized by high alumina content, i. e., the proportion of alumina to silica is higher than that occurring in mullite ($3Al_2O_3 \cdot 2SiO_2$), thereby assuring the production of corundum as the predominant crystalline phase rather than mullite.

A mixture of alumina ($Al_2O_3$) and clay ($Al_2O_3 \cdot 2SiO_2 \cdot 2H_2O$), and lithium in the form of a lithium compound is prepared in the form of bars and melted to a state of complete fusion as by introducing the bars into an electric arc. If cooled in the usual manner the crystals will be of large size, and while this is not objectionable in the case of certain types of refractories, it is desirable to have smaller crystals where the material is used in the manufacture of porcelains. To reduce the size of the crystals we have resorted to rapid cooling of the fused material as described and claimed in the prior patents of Taine G. McDougal, No. 1,909,785, granted May 16, 1933, and No. 1,862,974, granted June 14, 1932. As therein described this may be done by catching the fused droplets in a body of water, or, better, in a flowing stream of cool water. The material thus produced will be found to be partly crystalline, partly crypto-crystalline and in part amorphous.

To adapt mixtures containing lithium for the manufacture of porcelains by wet mixing methods, there should be added to the raw material which is to be fused a small proportion of magnesium oxide which unites with the lithium oxide and the silica to form an insoluble glass high in alumina.

We have found that the percentages of the ingredients in the melt may be varied a great deal, such changes, of course, producing changes in the character of the final product. We have produced a very satisfactory material from a mix containing approximately 90% alumina, 4% clay, 3% $Li_2O$ and 3% magnesia. About 80% of the material produced from this melt was found, when examined under the microscope, to consist of platy alpha-alumina with a high-alumina glass intercalated between the laminae. So thin are the individual plates and so intimate the association that one may not at first detect the presence of the glass, and instead measure the mean refractive index of the alumina and glass, thus leading to erroneous conclusions regarding the mineralogical constitution. But if the glass is dissolved out with hydrochloric acid, as may be readily done, the true character of the crystal is at once apparent.

A careful petrographic examination has revealed that the melt contains appreciable proportions of a new form of alumina. This form of alumina is produced where lithium is used as the flux and where as in the formula given the smaller amounts of silica are employed. This new form of alumina we prefer to designate as zeta alumina. It is isotropic, crystallizes in octahedrons, has a specific gravity of 3.6, and a refractive index of 1.736, with high dispersion. Like beta alumina its crystallization is depressed by silica, and increasing amounts of $Li_2O$ are required for its formation as the silica content becomes greater. Its stability range, however, is probably much greater than that of beta alumina. Zeta alumina is described on pages 362 to 364, inclusive, of vol. 15, No. 7, of the Journal of the American Ceramic Society, for July, 1932.

We have made up many lithium bodies other than the examples given. We have used lithium in the form of the oxide, hydroxide, and carbonate, and of the natural minerals such as spodumene, lepidolite and amblygonite; we have also varied the amounts of lithium with satisfactory results; in the case of lithium oxide we have varied the amount between 2 and 5% and in the case of lithium carbonate, between 4 and 11%. We have also used lithium in combination with various other fluxes. We have found, in general, that with reduction in the amount of alumina, the amount of zeta alumina produced is correspondingly reduced. In addition to substituting clay for the alumina, we have in some cases substituted zirconium and other ingredients.

We have made up porcelain bodies from the fused material in the manner previously described, and have put the bodies through special laboratory tests. We have also made them into the form of spark plugs, and have tested them in service in internal combustion engines. We have found that while the bodies possess satisfactory mechanical and dielectric strength, they are especially marked by extraordinary resistance to heat shock, far surpassing in this property any other bodies with which we are familiar. This superiority suggests certain special uses for the material whether incorporated in vitrified or unvitrified bodies, as in the manufacture of spark plugs, chemical porcelains, furnace linings, and the like where fracture from heat shock presents a serious problem.

Porcelains produced as above described will be found to possess the very desirable qualities previously referred to and this we believe to be due to the fact that we add to the porcelain batch and obtain within the porcelain large amounts of corundum crystals and glass high in alumina. The glassy ground-mass is formed not only from the glass introduced into the raw batch with the fused or calcined material, but also from the reaction of the flux with the ingredients incorporated with the clay.

In some cases it may be desirable to dispense with the use of the fused or calcined material and introduce all the ingredients directly into the porcelain batch, in which case the presence of the high percentage of alumina would give the desirable properties in the final fired product.

The fact that bodies made with different fluxes possess different properties suggests the combination of the fluxes to secure bodies combining these properties and we have done a great deal of work with such bodies. Thus in addition to combining lithium with magnesium, we have also combined it with calcium, thereby obtaining bodies combining to a degree the high heat shock resisting properties imparted by the lithium with the high electrical resistance at high temperatures resulting from the use of calcium.

The proportions of ingredients and the methods of manufacturing our improved porcelain are susceptible to very great variations in practice.

It is well known in the ceramic art that the firing temperature depends on the amount of flux employed since usually the greater the amount of flux, the lower the firing temperature. Hence where firing temperature or amount of flux are mentioned in the specification or claims, it will be understood that the amounts are not absolute but are subject to mutual change.

The ingredients of the batch may be introduced into the porcelain mass in various forms and it is entirely possible to add other ingredients to these compositions without materially changing the content of corundum crystals and high alumina glass. The silica content may be introduced as clay or silica in its various allotropic forms. The alumina may likewise go into the batch as a part of the clay or as pure alumina. Chromium oxide or zirconium oxide may be substituted in part for the alumina or silica. Various calcines or frits may also be made in order to embody the flux into the final mixture.

Where, in some of the claims, we refer to a single compound of a class, it is to be understood that the claims comprehend one or more compounds or mixtures of compounds of that class. Where the amount of flux is referred to it is given in terms of the oxides of the fluxing materials, but it is to be understood that materials having equivalent oxide content come within the scope of the description and claims.

We have not described the glazing of the bodies because this is a conventional operation and will be performed in the usual manner. It is well known in the art that it is occasionally necessary to make slight changes in the body composition to adapt it for use with a particular glaze, and our invention includes within its scope such usual minor variations.

It is obvious that other melting equipment than the electric furnace may be used to produce the non-plastic or fused material, and, of course, the quick cooling herein described may be dispensed with if large crystals are not objectionable.

The formulas given are all especially adapted for use with the wet mixing method, but it is obvious that the non-plastic material as well as the raw batch may be varied considerably in composition where dry-forming, casting, or other methods are employed.

The above are but a few of the modifications that readily occur to those skilled in the art and it is to be understood that the specification and claims are to be read in the light of such common knowledge.

We claim:

1. A porcelain body for use as an electrical insulator formed by firing to vitrification a mixture of raw clay and non-plastic material formed by fusing a ceramic batch consisting of approximately 90% alumina, 4% clay, 3% lithium oxide, and 3% magnesium oxide.

2. A raw ceramic batch consisting of approximately 90% alumina, 4% clay, 3% lithium oxide and 3% magnesium oxide.

HANS NAVRATIEL.
ALBRA H. FESSLER.